US008222839B2

(12) United States Patent
Murakami et al.

(10) Patent No.: US 8,222,839 B2
(45) Date of Patent: Jul. 17, 2012

(54) DIMMING CONTROL SYSTEM FOR VEHICULAR LAMP

(75) Inventors: Kentarou Murakami, Shizuoka (JP); Masayasu Ito, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 425 days.

(21) Appl. No.: 12/536,540

(22) Filed: Aug. 6, 2009

(65) Prior Publication Data

US 2010/0052537 A1 Mar. 4, 2010

(30) Foreign Application Priority Data

Aug. 29, 2008 (JP) ................................ 2008-221267

(51) Int. Cl.
*B60Q 1/14* (2006.01)
*H05B 37/02* (2006.01)

(52) U.S. Cl. .......................... 315/363; 315/77; 315/294

(58) Field of Classification Search .................. 315/363, 315/77, 82, 294, 297, 299, 307, 308, 320
See application file for complete search history.

(56) References Cited

U.S. PATENT DOCUMENTS 7,237,935 B2 7/2007 Ito et al.
2008/0197789 A1 * 8/2008 Shiotsu et al. ................ 315/297

FOREIGN PATENT DOCUMENTS

JP 2005-259603 9/2005

* cited by examiner

*Primary Examiner* — Daniel D Chang
(74) *Attorney, Agent, or Firm* — Fish & Richardson P.C.

(57) ABSTRACT

A dimming control system 1 includes: light source units each having a respective LED; and a control unit connected to the light source units via power supply lines. The control unit is connected to each of the light source units in series. The control unit includes: switch portions that control dimming of the LEDs by repeating an ON/OFF operation in a predetermined cycle; current detection circuits and voltage detection circuits that detect a current or a voltage supplied via the power supply lines; and a CPU that determines there is an abnormality in the power supply lines or the light source units when a value of the detected current or voltage exceeds a predetermined range while the switch portions are ON.

5 Claims, 12 Drawing Sheets

| ABNORMAL STATE | | NORMAL LIGHTING | DIMMING |
|---|---|---|---|
| OUTPUT WIRING ABNORMALITY | OPEN | **CURRENT: SMALL** | **CURRENT: SMALL** |
| | SHORT | **VOLTAGE: SMALL** | **VOLTAGE: SMALL** |
| | GROUND FAULT | **VOLTAGE: SMALL** | **VOLTAGE: SMALL** |
| LIGHT SOURCE UNIT ABNORMALITY | OPEN | **CURRENT: SMALL** | **CURRENT: SMALL** |
| | SHORT | **CURRENT: SMALL** | **CURRENT: SMALL** |
| | GROUND FAULT | **CURRENT: SMALL** | **CURRENT: SMALL** |

DIMMING CONTROL SYSTEM FOR VEHICULAR LAMP

CROSS-REFERENCE TO RELATED APPLICATION(S)

This application claims the benefit of priority of Japanese Patent Application No. 2008-221267, filed on Aug. 29, 2008. The contents of the Japanese application are incorporated herein by reference.

TECHNICAL FIELD

The present disclosure relates to a dimming control system for a vehicular lamp, and more particularly to a dimming control system for a vehicular lamp including a light source unit that has a semiconductor light source and a control unit that controls dimming of the light source unit.

BACKGROUND

In general, a dimming control system for a vehicular lamp includes: multiple light source units each having a semiconductor light source and a current control portion that controls a drive current for driving the semiconductor light source; and a control unit that is connected to the light source units via power supply lines. The control unit includes switch devices (switch portions) that control dimming of the light source units by repeatedly switching between ON and OFF in predetermined cycles.

Dimming of a vehicular lamp is controlled by detecting an external light and executing a control in accordance with the brightness of the detected external light. For example, brightness is required less in the evening than at night (at normal times). Therefore, the dimming control of the vehicular lamp is performed such that the brightness of the headlamp is slightly darker than normal.

Abnormality in the power supply lines or the light source units when the light source units are lit is determined by detecting a current value or a voltage value supplied via the power supply lines and determining whether the detected current value or voltage value exceeds a predetermined value. The determination is performed by an abnormality determination process program stored in a CPU (central processing unit) in the control unit.

SUMMARY

As described above, the dimming control of the light source units is performed by repeatedly turning the switch devices ON and OFF in predetermined cycles. In the conventional dimming control system for a vehicular lamp described above, the current value or the voltage value supplied via the power supply lines is detected not only when the switch devices are ON but also when the switch devices are OFF. Therefore, the detected current value or voltage value may be determined as lower than the predetermined value and result in the determination of an abnormality in the power supply lines or the light source units.

Consequently, an abnormality determination regarding the power supply lines or the light source units cannot be precisely carried out.

The present disclosure describes a technique to precisely carry out an abnormality determination for the power supply lines or the light source units during a dimming control of the light source units.

A dimming control system for a vehicular lamp according to an aspect of the present invention includes: light source units each having a semiconductor light source and a current control portion that controls a drive current for driving the semiconductor light source; and a control unit that is connected to the light source units via power supply lines. The control unit includes: switch portions that are respectively connected in series to the light source units and control dimming of the semiconductor light sources by repeating an ON/OFF operation in a predetermined cycle; abnormality detection portions that detect a current or a voltage supplied via the power supply lines; and an abnormality determination portion that determines there is an abnormality in the power supply lines or the light source units when a value of the detected current or voltage exceeds a predetermined range while the switch portions are ON.

Thus, when the value of the detected current or voltage exceeds a predetermined range while the switch portions are ON, an abnormality is determined to be present in the power supply lines or the light source units, and a stop control of the power supply to the light source units is executed.

A dimming control system for a vehicular lamp according to another aspect of the present invention can include: light source units each having a semiconductor light source and a current control portion that controls a drive current for driving the semiconductor light source; and a control unit that is connected to the light source units via power supply lines. The control unit includes: switch portions that are respectively connected in series to the light source units and control dimming of the semiconductor light sources by repeating an ON/OFF operation in a predetermined cycle; abnormality detection portions that detect a current or a voltage supplied via the power supply lines; and an abnormality determination portion that determines there is an abnormality in the power supply lines or the light source units when a value of the detected current or voltage exceeds a predetermined range while the switch portions are ON.

Thus, a control is executed such that the abnormality determination is performed only when the switch portions are ON during the dimming operation by turning ON/OFF the switch portions. Therefore, it is possible to precisely determine the presence of an abnormality in the power supply lines or the light source units.

Various implementations can include one or more of the following features. For example, the predetermined cycle can include a first cycle and a second cycle that is longer than the first cycle, and the ON/OFF operation can be repeated in both the first cycle and the second cycle. The switch portions each can be controlled such that an ON period of the second cycle is longer than an ON period of the first cycle, and such that the abnormality determination portion performs an abnormality determination during the ON period of the second cycle. Therefore, it is possible to detect the current value in a stable manner.

In some implementations, the abnormality determination portion performs the determination after a resonance period that comes immediately after the switch portions are turned ON. Therefore, it is possible to detect the detected current in a stable manner and precisely detect the current.

In some implementations, the abnormality determination portion determines there is an abnormality in the power supply lines or the light source units if a number of times when the current or the voltage exceeding the predetermined range is detected is equal to or greater than a predetermined number of times. Therefore, it is possible to precisely determine the abnormality.

BRIEF DESCRIPTION OF THE DRAWINGS

FIG. 7 is a diagram showing an example in which a value of a PWM timer is set such that an initial ON/OFF setting of the switch portions is ON.

DETAILED DESCRIPTION OF PREFERRED EMBODIMENT(S)

Figure 1:
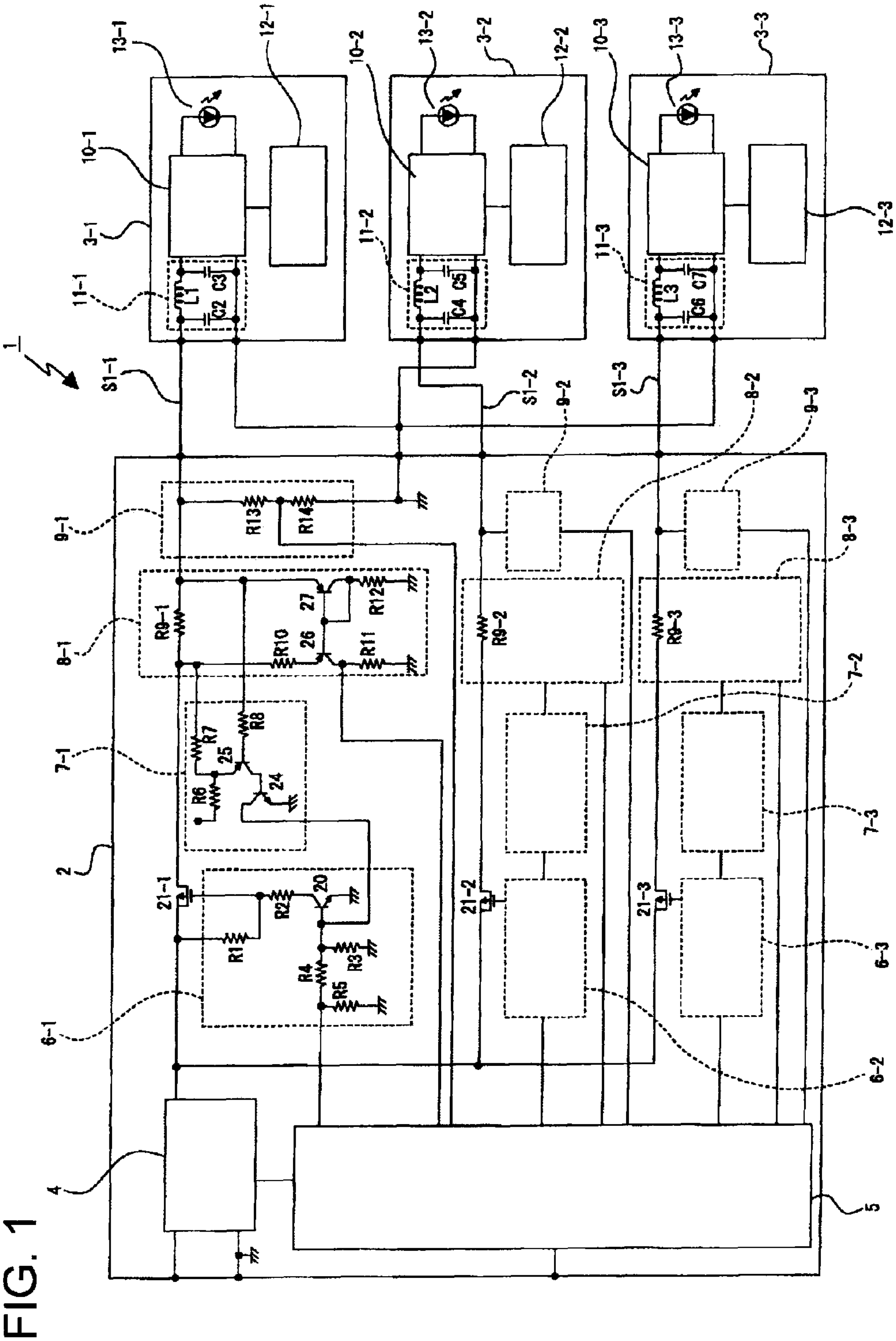
FIG. 1 is a diagram showing an example of the configuration of a dimming control system according to a first embodiment of the present invention.

In the following paragraphs, a dimming control system for a vehicular lamp according to a first embodiment of the present invention is described. FIG. 1 is a diagram showing a configuration of the dimming control system for a vehicular lamp according to the first embodiment of the present invention.

A dimming control system 1 includes a control unit 2 and, for example, three light source units 3-1 to 3-3. The control unit 2 includes an input circuit 4; a central processing unit (CPU) 5 serving as an abnormality determination portion; PMOS transistors 21-1 to 21-3 serving as switch portions that respectively dim the light source units 3-1 to 3-3; switch control circuits 6-1 to 6-3 that respectively perform ON/OFF control of the PMOS transistors 21-1 to 21-3; current limiting circuits 7-1 to 7-3 that cause the switch control circuits 6-1 to 6-3 to turn OFF the PMOS transistors 21-1 to 21-3; and current detection circuits 8-1 to 8-3 and voltage detection circuits 9-1 to 9-3 serving as abnormality detection portions that detect an abnormality in the light source units 3-1 to 3-3 and output wiring of the control unit 2.

The input circuit 4 includes a noise filter and a surge protection device (a surge absorber or a power zener diode) against, for example, a dump surge.

Each of the switch device control circuits 6-1 to 6-3 includes an NPN transistor 20 having a collector connected to a gate of each of the PMOS transistors 21-1 to 21-3, and resistances R1 to R5.

Each of the current limiting circuits 7-1 to 7-3 includes an NPN transistor 24 having a collector connected to a base of the NPN transistor 20, a PNP transistor 25 having an emitter connected to a base of the NPN transistor 24, and resistances R6 to R8. Each of the current detection circuits 8-1 to 8-3 includes resistances R10 to R12, shunt resistances R9-1 to R9-3, and PNP transistors 26, 27 whose bases are connected to each other. Collectors of respective PNP transistors 26 are connected to the CPU 5. Each of the voltage detection circuits 9-1 to 9-3 includes resistances R13, R14, and each node between the resistances R13 and R14 is connected to the CPU 5. The shunt resistances R9-1 to R9-3 are connected to the PMOS transistors 21-1 to 21-3 in series, respectively.

The light source units 3-1 to 3-3 include resonant circuits (noise filters) 11-1 to 11-3, switching regulators 10-1 to 10-3 serving as current control portions, control circuits 12-1 to 12-3, and light emitting diodes (LEDs) 13-1 to 13-3 serving as semiconductor light sources, respectively.

The resonant circuits 11-1 to 11-3 include coils L1 to L3 and capacitors C2 to C7, respectively. Respective ends of the capacitors C2, C4, C6 are connected to the shunt resistances R9-1 to R9-3 via power supply lines S1-1 to S1-3.

Operations of the dimming control system according to the first embodiment are described next.

The LEDs 13-1 to 13-3 are turned ON/OFF and dimmed by controlling the supply of DC voltage to the light source units 3-1 to 3-3 by turning the PMOS transistors 21-1 to 21-3 ON/OFF.

The ON/OFF operation of the PMOS transistors 21-1 to 21-3 is controlled by the CPU 5 and the switch device control circuits 6-1 to 6-3.

Turning the LEDs 13-1 to 13-3 ON/OFF is performed by turning the PMOS transistors 21-1 to 21-3 ON/OFF.

The LEDs 13-1 to 13-3 are dimmed by turning the PMOS transistors 21-1 to 21-3 ON/OFF at a high speed (e.g., several hundred Hz to several kHz) and repeatedly supplying and stopping power to the switching regulators 10-1 to 10-3 (starting/stopping the switching regulators) so that the LEDs 13-1 to 13-3 flash at a high speed. This type of dimming of the LEDs 13-1 to 13-3 includes PWM dimming, for example.

The PMOS transistors 21-1 to 21-3 are employed as an example of the switch portions (switch devices) in the illustrated embodiment. However, bipolar transistors may be used in some implementations.

Each of the current detection circuits 8-1 to 8-3 detects a current value of the current that flows through the shunt resistances R9-1 to R9-3. The detected current value is provided to the CPU 5 via the PNP transistors 26, 27. Each of the voltage detection circuits 9-1 to 9-3 detects a voltage value of the voltage that is supplied to the light source units 3-1 to 3-3. The detected voltage value is split by the resistances R13, R14 so as to be provided to the CPU 5. Data of the current value and the voltage value provided to the CPU 5 are stored in a memory (not shown) in the CPU 5.

The abnormality determination for the light source units 3-1 to 3-3 and the power supply lines S1-1 to S1-3 (output wiring) of the control unit 2 is carried out based on whether the detected current value or voltage value has exceeded the predetermined range as described below. The abnormality determination process is performed by executing a current/voltage detection program for detecting the current value or the voltage value input to the CPU 5 and an abnormality determination program for determining abnormality. Both programs are stored in memory (not shown) in the CPU 5.

Next, the abnormality determination process using the current/voltage detection program and the abnormality determination program mentioned above are described. The current/voltage detection program is executed only when the PMOS transistors 21-1 to 21-3 are ON. When the detected current value or voltage value exceeds the predetermined range, the abnormality determination program determines there is an abnormality in the power supply lines S1-1 to S1-3 or the light source units 3-1 to 3-3.

Figure 2:
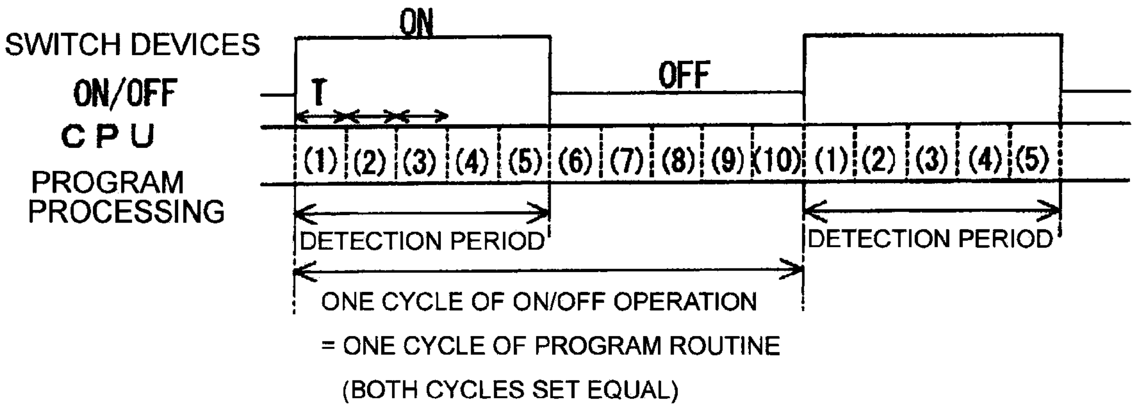
FIG. 2 is a diagram showing a relationship between an ON period of switch portions and a detection period of a current or a voltage.

One cycle of the ON/OFF operation of the PMOS transistors 21-1 to 21-3 during dimming is set equal to one cycle of the program routine of the current/voltage detection program. As shown in FIG. 2, the processing for the above programs is performed during the ON-OFF period of the PMOS transistors 21-1 to 21-3 (the period from (1) to (10) divided by a predetermined time T). In this case, the processing of the current/voltage detection program is performed during the ON period of the PMOS transistors 21-1 to 21-3 (the period from (1) to (5) in FIG. 2). The processing of the current/voltage detection program is performed at any time during the ON period. Therefore, incorrect determination of abnormality do not occur, which would have occurred if the processing of the current/voltage detection program were performed during the OFF period and a low current value detected. As a result, the abnormal state can be precisely determined.

The current/voltage detection program preferably is executed during a period immediately after the PMOS transistors 21-1 to 21-3 are turned ON. For example, when processing of the above current/voltage detection program is performed in the period (1) or (2), the current value or the voltage value can be reliably detected during the ON period even if the on-duty ratio (dimming ratio) of the PMOS transistors 21-1 to 21-3 is reduced from 50% to 25%, for example.

Figure 3:
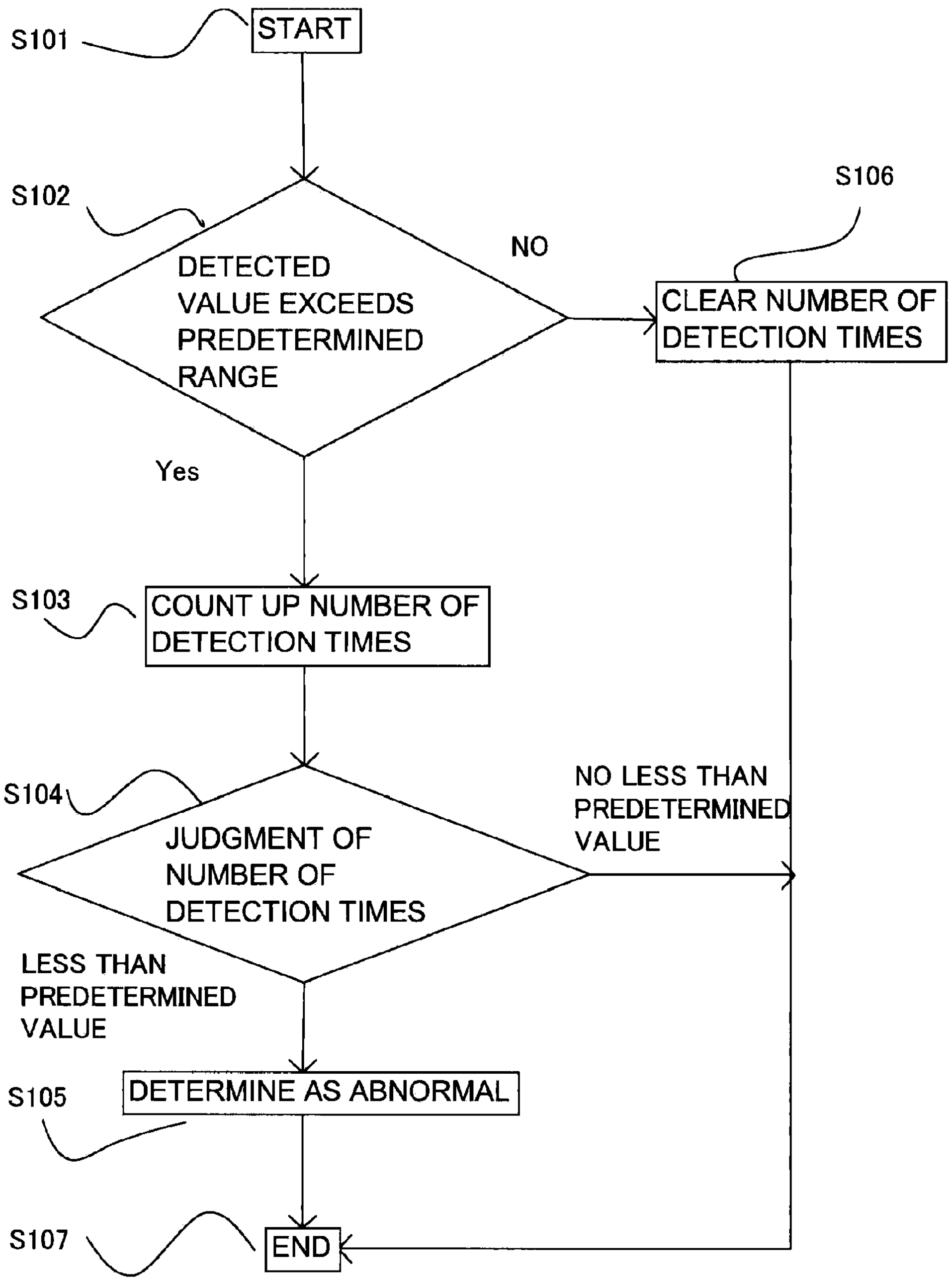
FIG. 3 is a diagram showing an example of an abnormality determination program.

A first example of the processing of the abnormality determination program is described with reference to the flowchart shown in FIG. 3. In this abnormality determination program, an abnormality is determined by focusing on the number of detection times, that is, the number of times of determining whether the current value or the voltage value (which are referred to below as a "detected value") exceeds a predetermined range. In the description below, the detected value exceeding the predetermined range means: the current value is equal to or less than a predetermined value, or equal to or greater than a predetermined value if the detected value is the current value; and the voltage value is equal to or greater than a predetermined value, or equal to or less than a predetermined value if the detected value is the voltage value.

First, it is determined whether the detected value exceeds the predetermined range (step S102). Next, in the case where the detected value exceeds the predetermined range, a count computation (counting up) of the number of detection times is started (step S103). Next, it is determined whether the counted number of detection times is equal to or greater than a predetermined value (step S104). When the number of detection times is equal to or greater than the predetermined value, it is determined as abnormal (step S105) and the abnormality determination program ends (step S107).

When the number of detection times is less than the predetermined value at step S104, it is determined as normal and the abnormality determination program ends (step S107).

When the detected value does not exceed the predetermined range at step S102, the number of detection times is cleared (reset) (step S106), and then the abnormality determination program ends (step S107). When the number of detection times is less than the predetermined value, it is determined as normal and the abnormality determination program ends (step S107).

Figure 4:
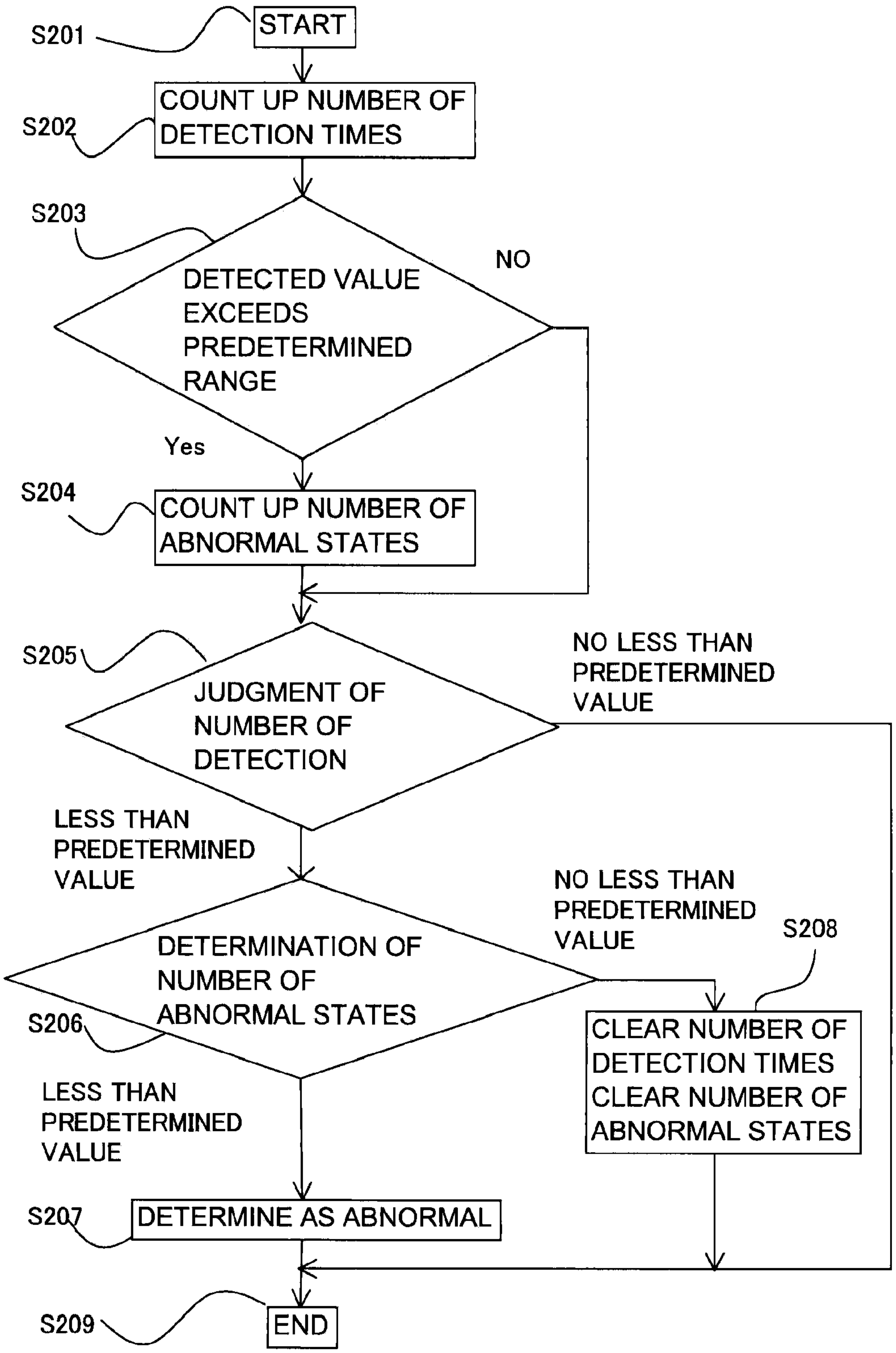
FIG. 4 is a diagram showing another example of the abnormality determination program.

A second example of the processing of the abnormality determination program will be described with reference to the flowchart shown in FIG. 4. In this abnormality determination program, the number of detection times is counted up (step S202) before the process of determining whether the detected value exceeds the predetermined range (step S203). After the determination process at steps S203, the number of abnormal states is counted up (step S204) if the detected value exceeds the predetermined range. Subsequently, it is determined whether the counted number of detection times is equal to or greater than the predetermined value (step S205). When the number of detection times is equal to or greater than the predetermined value, it is determined whether the counted number of abnormal states is equal to or greater than the predetermined value (step S206). When the number of abnormal states is equal to or greater than the predetermined value, it is determined as abnormal (step S207) and the abnormality determination program ends (step S209). If the number of detection times is less than the predetermined value at step S205, it is determined as normal and the abnormality determination program ends (step S209). If the number of abnormal states is less than the predetermined value at step S206, it is determined as normal and the number of detection times and the number of abnormal states are cleared (reset) (step S208). Then, the abnormality determination program ends (step S209). If the detected value does not exceed the predetermined range in the determination process at step S203, the routine follows the processing flow at steps S205 to S209.

Figure 5:
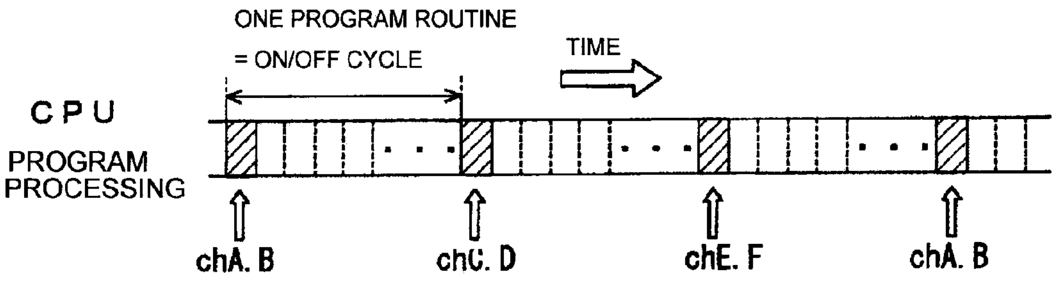
FIG. 5 is a diagram for explaining a processing timing of a current/voltage detection program.

Next, the processing timing of the current/voltage detection program is described. FIG. 5 is a diagram for explaining the processing timing of the current/voltage detection program.

If the ON/OFF frequency of the PMOS transistors 21-1 to 21-3 is too low during dimming, the flashing of the LEDs 13-1 to 13-3 is visible to viewers. Therefore, the ON/OFF frequency must be 200 Hz (cycle=5 ms) or higher. For example, in the case where the on-duty lower limit is 5%, the minimum value of the ON period of the PMOS transistors 21-1 to 21-3 is 250 μs (=5 ms×5%). By executing the processing of the above current/voltage detection program during this 250 μs, it is possible to precisely determine the abnormal state within the dimming ratio ranging from 5% to under 100%.

In the processing of the above current/voltage detection program, the number of detection processes executed is equal to the number of channels (ch number) of the light source units 3-1 to 3-3. If the processes for all the channels are executed in the current/voltage detection program during one program routine, the processing time becomes longer and the minimum value of the above ON period thus becomes larger. In such a case, either the on-duty range in which dimming control can be performed decreases, or the detection process cannot be performed during the 5% on-duty dimming. Therefore, the number of channels is divided before the current/voltage detection program is executed during one program routine, as shown in FIG. 5. This shortens the processing time and decreases the minimum value of the ON period (hatching areas in FIG. 5). The example in FIG. 5 is one in which detection is performed on two channels among a total of six channels (channels chA to chF) per routine.

In the abnormality determination processing, when the detected current value is high, e.g. when an abnormality arises due to a short circuit in the output wiring of the control unit 2 or the like, the risk of smoke or fire in the PMOS transistors 21-1 to 21-3 or the shunt resistances R9-1 to R9-3 increases.

Therefore, the current limiting circuits 7-1 to 7-3 provided in the dimming control system according to the present invention have a function for reducing the above risk of smoke or fire when the detected current value is high, as described below.

The current limiting circuits 7-1 to 7-3 detect a voltage drop in the shunt resistances R9-1 to R9-3, respectively, and control the current value of the current flowing through the PMOS transistors 21-1 to 21-3 to under a predetermined value. A voltage difference ($V_{be}$) between the emitter and the base of the PNP transistor 25 increases as the detected current increases. When the detected current exceeds the voltage difference ($V_{be}$), the PNP transistor 25 turns ON and the NPN transistor 24 connected to the collector of the PNP transistor 25 also turns ON. When the NPN transistor 24 turns ON, the NPN transistor 20 in the switch device control circuits 6-1 to 6-3 turns OFF. In this way, when the detected current becomes equal to or greater than the predetermined value, the PMOS transistors 21-1 to 21-3 are turned OFF so as to control the current, thereby avoiding the risk described above when the current value becomes high.

Figure 6:
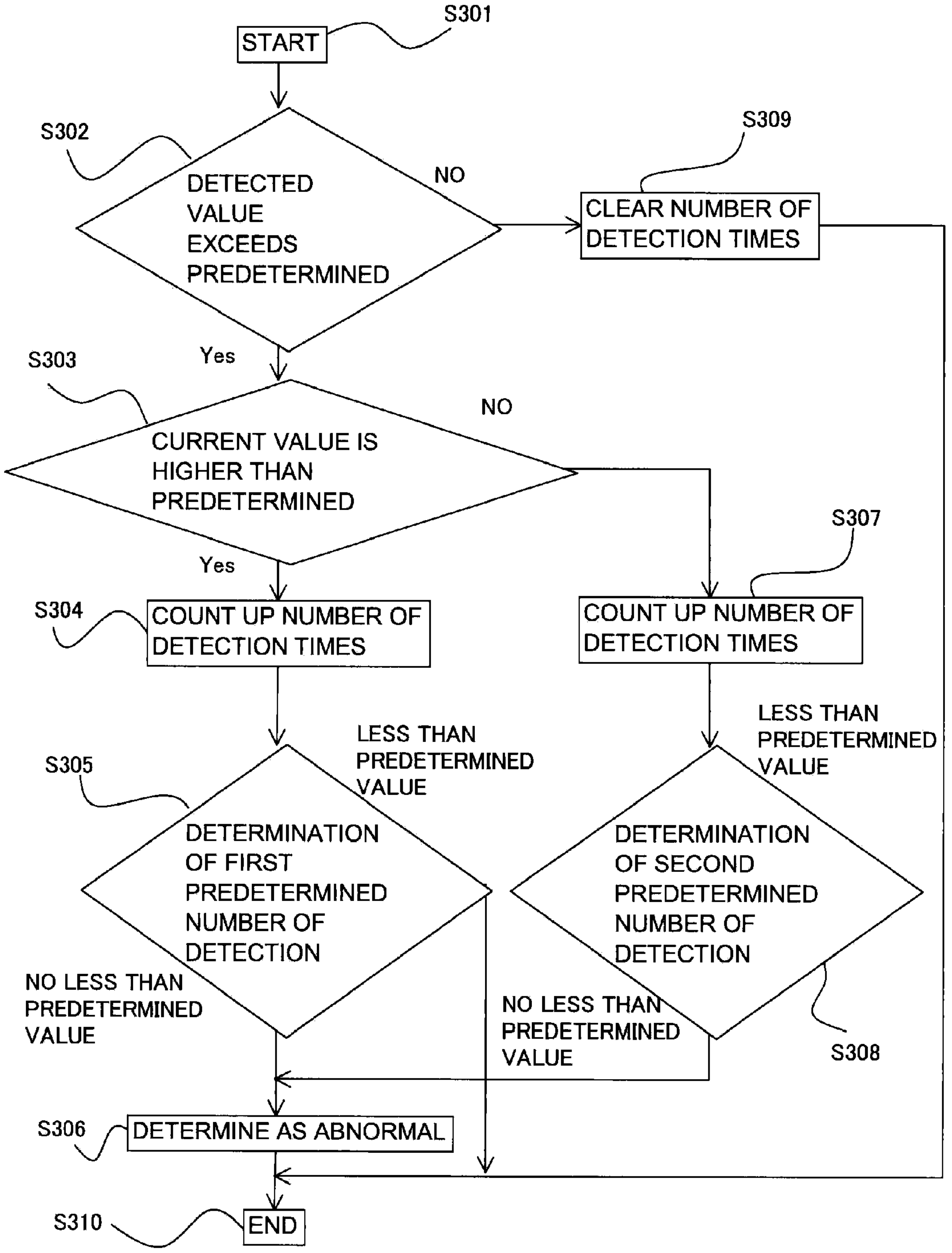
FIG. 6 is a diagram showing yet another example of the abnormality determination program.

Next, the abnormality determination program for performing the abnormality determination process in a short period only when the current value or the voltage value detected in the current detection circuits 9-1 to 9-3 exceeds the predetermined range and the current value is higher than the predetermined value is described with reference to the flowchart shown in FIG. 6.

First, it is determined whether the detected value (current value or voltage value) is within the predetermined range (step S302). When the detected value exceeds the predetermined range, it is determined whether the current value is above the predetermined range (step S303). The predetermined value is set by presetting a maximum current value that does not cause a risk of smoke or fire in the shunt resistances R9-1 to R9-3 or the like, for example.

When the detected current value is higher than the predetermined value, the number of detection times is counted up (step S304). Next, it is determined whether a first predetermined number of detection times is equal to or greater than a predetermined value (step S305). When the first predetermined number of detection times is equal to or greater than the predetermined value, it is determined as abnormal (step S306) and the abnormality determination program ends (step S310). When the first predetermined number of detection times is less than the predetermined value, it is determined as normal and the abnormality determination program ends (step S310). When the current value is below the predetermined range at step S303, the number of detection times is also counted up (step S307). It is then determined whether a second predetermined number of detection times that is set greater than the first predetermined number of detection times is equal to or greater than the predetermined value (step S308). When the second predetermined number of detection times is equal to or greater than the predetermined value, it is determined as abnormal (step S306) and the abnormality determination program ends (step S310). When the second predetermined number of detection times is less than the predetermined value, it is determined as normal and the abnormality determination program ends (step S310). If the detected value does not exceed the predetermined range in the determination process at steps S302, the number of detection times is cleared (reset) (step S309), and then the abnormality determination program ends (step S310).

In the case where the abnormality determination process is performed by the foregoing abnormality determination program, if the detected current value is high, it is possible to reduce the number of abnormality detection times (the first predetermined number of detection times in FIG. 6) and perform the abnormality determination in a short period to turn OFF (stop) the PMOS transistors 21-1 to 21-3, thereby avoiding the above risk without providing the current limiting circuits 7-1 to 7-3 described above. In addition, not only when the detected current is high but also when the detected current value is low (when an abnormality occurs due to a disconnection of the output wiring of the control unit 2), the series of processes at steps S303, S307, and S308 can be used. This is because the above risk does not arise when the detected current value is low, and it is thus possible to increase the number of abnormality detection times (the second predetermined number of detection times in FIG. 6) to perform the abnormality determination in a longer period.

Figure 7:
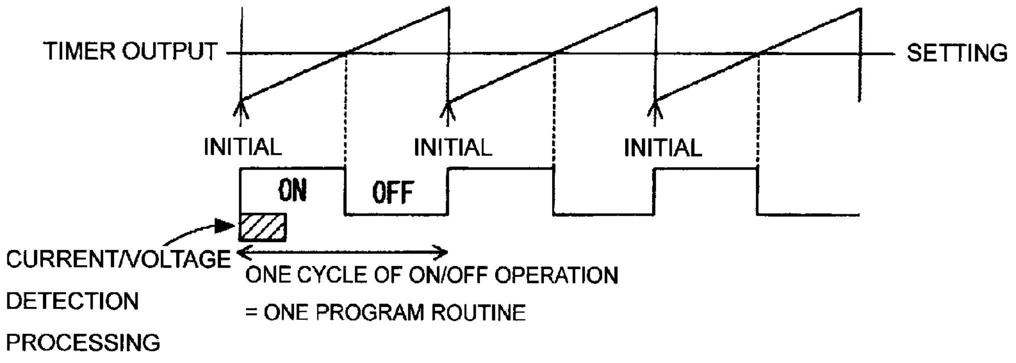

The duty ratio of the PMOS transistors 21-1 to 21-3 during dimming is controlled by setting an output value of a PWM (pulse width modulation) timer (not shown) provided in the CPU 5. FIG. 7 shows an example in which the value of the PWM timer is set such that the initial ON/OFF setting of the PMOS transistors 21-1 to 21-3 is ON. The upper portion shows an output signal of the PWM timer, and the lower portion shows an ON/OFF signal of the PMOS transistors 21-1 to 21-3 synchronized with the output signal of the PWM timer. The hatching area shows a period for processing the current/voltage detection program.

Figure 8:
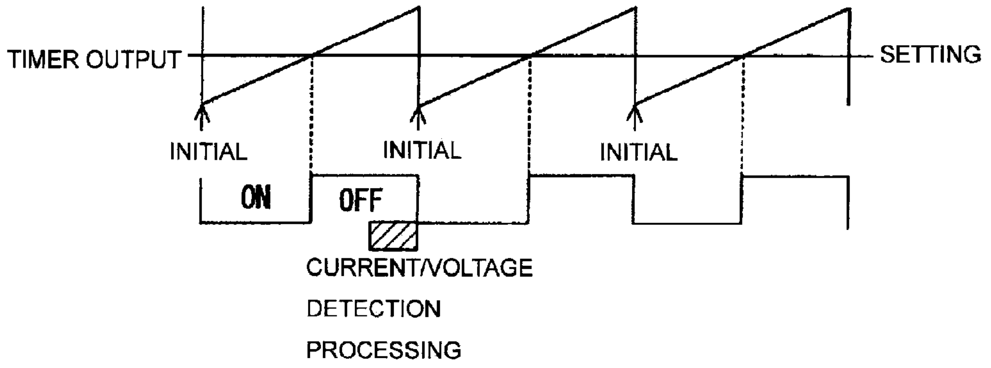
FIG. 8 is a diagram showing an example in which the value of the PWM timer is set such that the initial ON/OFF setting of the switch portions is OFF.

As shown in FIG. 8, the phase can be inverted such that the initial ON/OFF setting of the PMOS transistors 21-1 to 21-3 is OFF. In this case, the detection period is not a duration of 250 μs after the PMOS transistors 21-1 to 21-3 are turned ON, but a duration of 250 μs before the PMOS transistors 21-1 to 21-3 are turned OFF.

Next, a dimming control system for a vehicular lamp according to a second embodiment of the present invention will be described with reference to FIGS. 9 to 15.

Figures 9, 10:
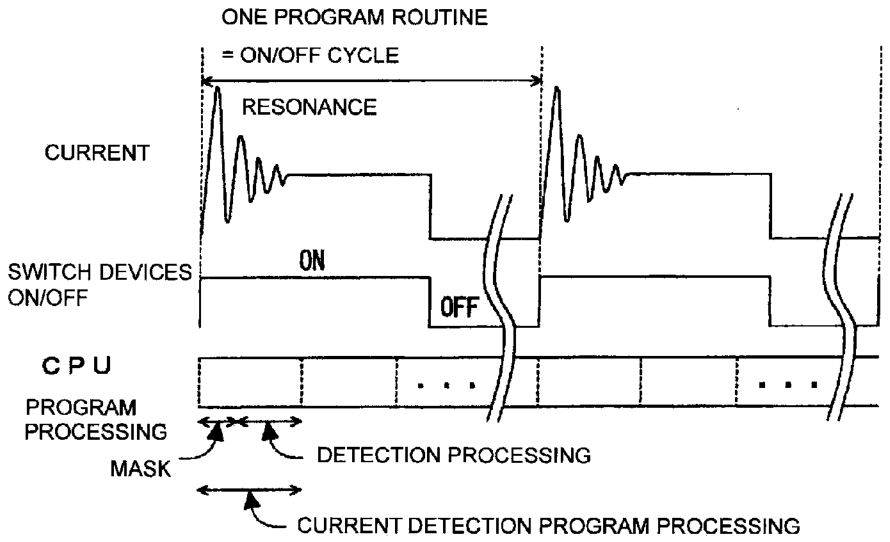
FIG. 9 is a diagram showing types of output abnormalities of light source units and output wiring abnormalities of a control unit, and a magnitude of the detected current/voltage that is determined to be abnormal.
FIG. 10 is a diagram showing a relationship between a resonant current immediately after the switch portions are turned ON and a mask period in which the current detection is not performed.

As shown in FIG. 9, output abnormalities of the light source units 3-1 to 3-3 and abnormalities in the output wiring of the control unit 2 include abnormalities due to an open circuit, a short circuit and a ground fault. The abnormality detection is performed based on whether the current or voltage is small. In this detection, when an output abnormality of the light source units 3-1 to 3-3 and an abnormality in the output wiring of the control unit 2 are detected by detecting the fact that the current during dimming is small (hatching areas in FIG. 9), the detected current resonates immediately after the PMOS transistors 21-1 to 21-3 are turned ON, due to the coils (L1 to L3) and the capacitors (C2 to C7) that constitute resonant circuits 11-1 to 11-3 provided at respective input portions of the light source units 3-1 to 3-3.

When the detected current resonates in the abnormality detection, the value of the detected current is unstable during the resonance as shown in FIG. 10, and thus, precise current detection cannot be performed. Therefore, as shown in the lower portion of FIG. 10, a mask period in which the current detection is not performed is provided immediately after the PMOS transistors 21-1 to 21-3 are turned ON, and the abnormality determination program is executed after the mask period. The mask period preferably is set to be equal to the resonance period. Moreover, the mask period preferably is at least twice as long as resonance frequency time (resonance cycle) in order to detect a stable, precise current value after the resonant oscillation weakens.

Figure 11:
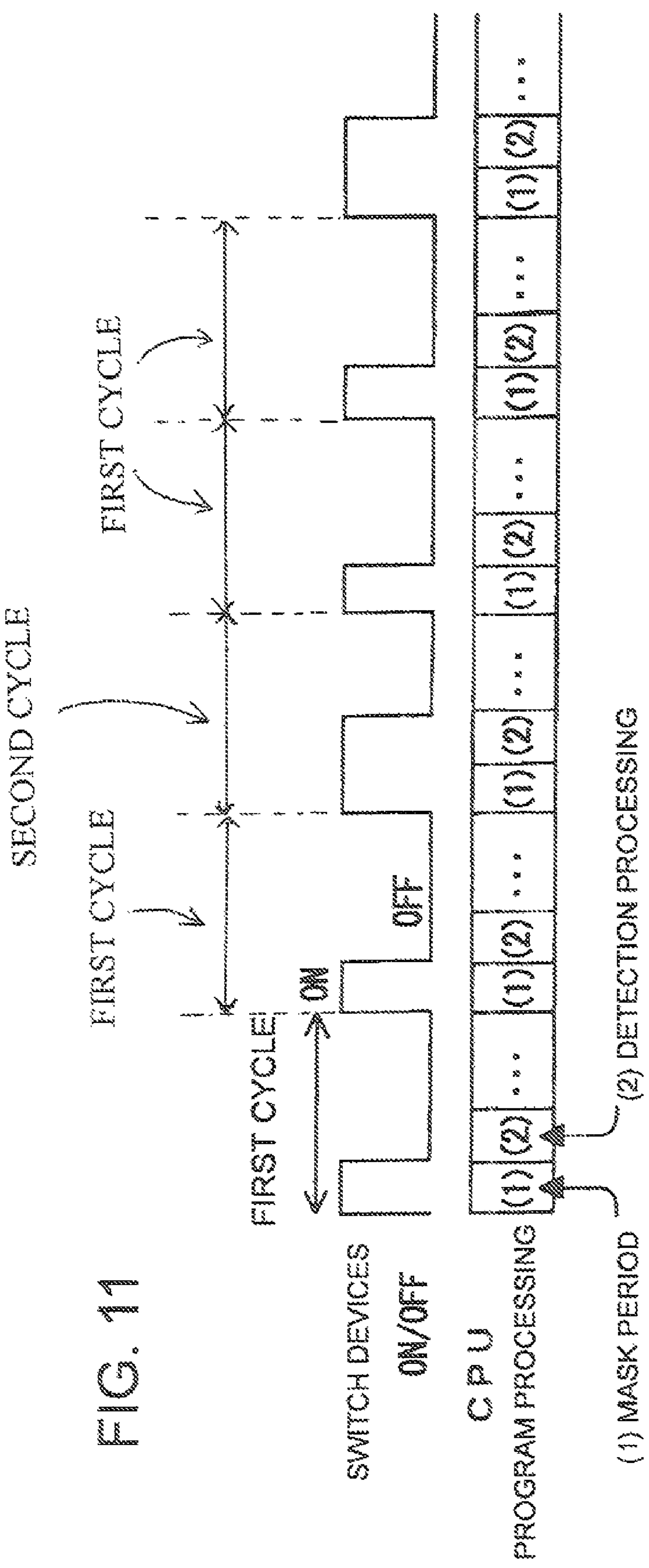
FIG. 11 is a diagram showing a relationship between an ON/OFF cycle of the switch portions and a processing period.

FIG. 11 shows a relationship between the ON/OFF cycle of the switch portions and the processing period. In the example of FIG. 11, the ON period of the PMOS transistors 21-1 to 21-3 is only as long as the mask period (period (1) in FIG. 7). In the case where the ON period is short as shown in FIG. 11, the PMOS transistors 21-1 to 21-3 are turned OFF after the mask period, as described above. Therefore, the current cannot be detected.

Thus, as shown in FIG. 11, the ON/OFF operation of the PMOS transistors 21-1 to 21-3 is set so as to be repeatedly performed during one or more first cycles and a second cycle that is longer than the first cycle. The ON period of the PMOS transistors 21-1 to 21-3 in the second cycle is set longer than the ON period of the PMOS transistors 21-1 to 21-3 in the first cycle. This setting program is stared in memory (not shown) in the CPU 5. Hereinafter, a function for setting the ON period of the switch devices in the second cycle longer than the ON period of the switch devices in the first cycle is referred t as modulation function.

This makes it possible to perform the abnormality detection processing using the current value during the ON period in the second cycle. By performing the abnormality detection processing using a current value only in a period that is set longer in the second cycle, a stable current value can be detected. As a result, it is possible to precisely perform the abnormality determination during dimming in an on-duty ratio whose ON period is only as long as the mask period.

Figure 12:
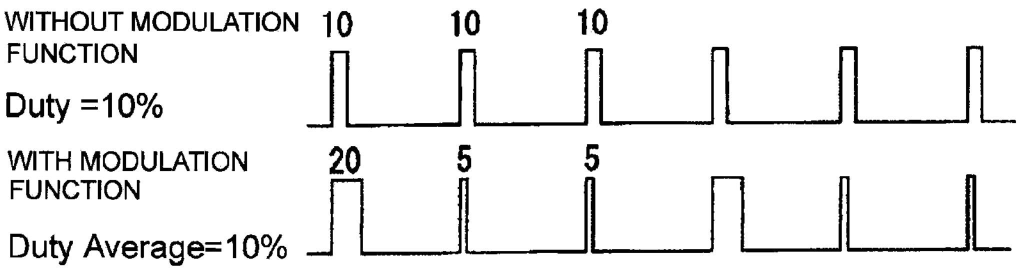
FIG. 12 is a diagram showing dimming ratios with and without a modulation function.
Figure 13:
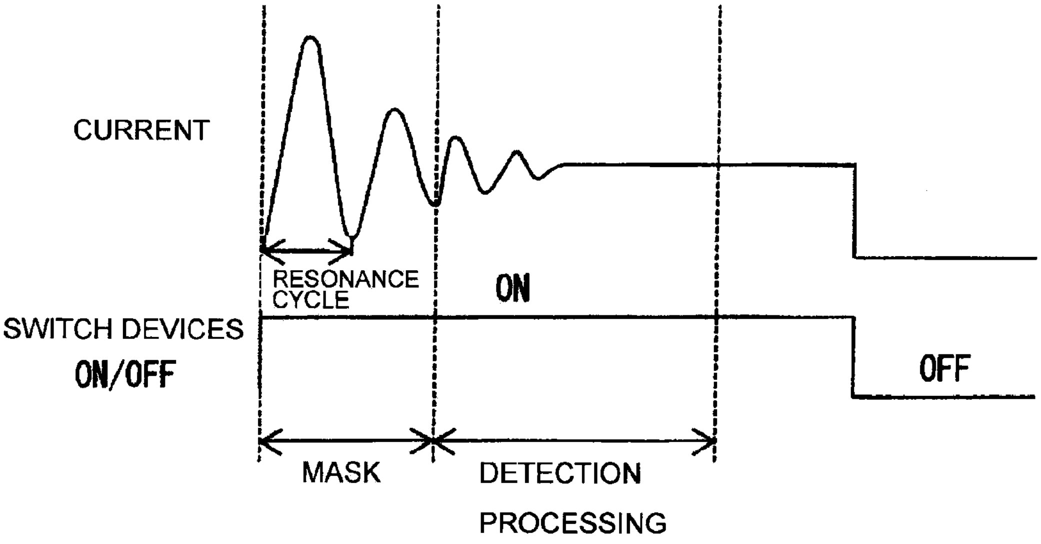
FIG. 13 is a diagram showing an example of the relationship between a resonance cycle of the resonant current immediately after the switch portions are turned ON and the mask period.
Figure 14:
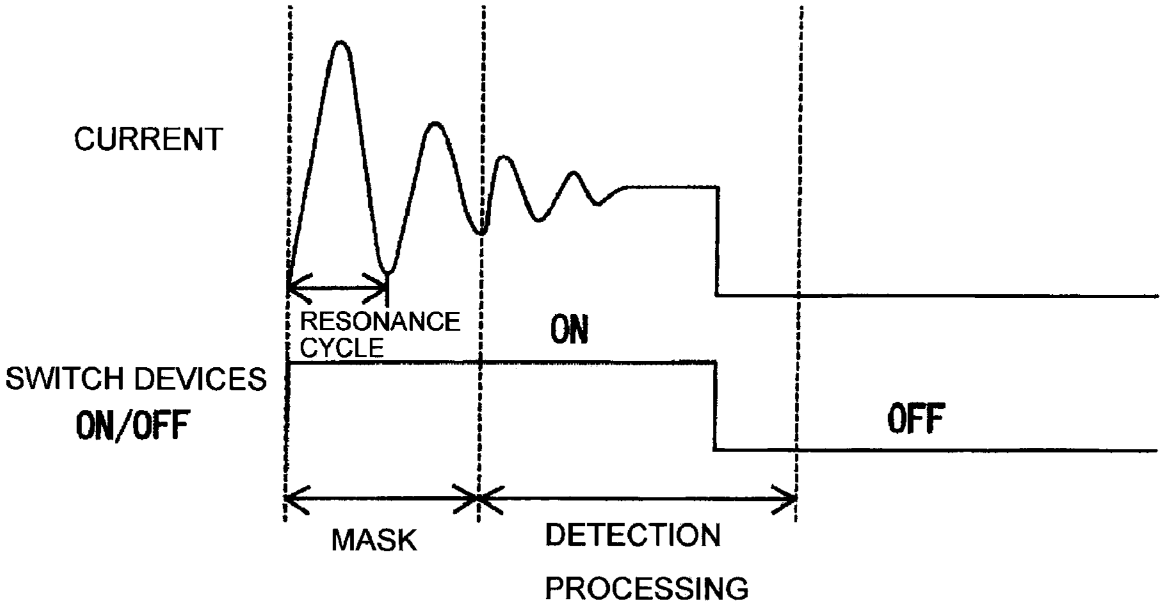
FIG. 14 is a diagram showing another example of the relationship between the resonance cycle of the resonant current immediately after the switch portions are turned ON and the mask period.

When dimming is performed by setting the ON period of the PMOS transistors 21-1 to 21-3 constant, dimming is controlled such that the on-duty ratio in one cycle of the PMOS transistors 21-1 to 21-3 is the dimming ratio (ratio of an on-duty amount of light to an off-duty amount of light), as shown in an upper portion of FIG. 12. In the example in the upper portion of FIG. 12, the dimming ratio is set to 10%.

As shown in the lower portion of FIG. 12, when the modulation function described above is in operation, the ON period and the on-duty ratio are controlled such that the average value of the on-duty ratio ((20+5+5)÷3=10) in the example of the lower portion in FIG. 12) in one cycle of the PMOS transistors 21-1 to 21-3 (corresponding to the second cycle in FIG. 11) is equal to the dimming ratio (10%) when the modulation function is not in operation. In the example of FIG. 11, a first on-duty ratio (the first on-duty period from the left in the lower portion of FIG. 12) when the modulation function is in operation is set to 20%. Thus, by setting second and third on-duty ratios (the second and third on-duty periods from the left in the lower portion of FIG. 12) to 5%, it is possible to perform a control equivalent to the dimming ratio (10%) without the modulation function. That is, the dimming ratio with the modulation function is no different from that without the modulation function.

The foregoing modulation function is set so as to work when the on-duty ratio of the PMOS transistors 21-1 to 21-3 is smaller than a predetermined value described below.

In the case of a dimming control in which the ON period of the PMOS transistors 21-1 to 21-3 is longer than the sum of the mask period and the detection processing time (see FIG. 13), the resonant oscillation does not occur in the detection period. Therefore, it is possible to precisely detect the current without the modulation function that is used to precisely detect the current in a stable manner.

In the case of a dimming control in which the ON period of the PMOS transistors 21-1 to 21-3 is shorter than the sum of the mask period and the detection processing time (see FIG. 14), the resonant oscillation remains in the detection period. Therefore, the current cannot be precisely detected in a stable manner, and thus, it is necessary to use the modulation function.

Accordingly, the predetermined value of the on-duty ratio for determining the operation/stopping of the modulation function must be set as a duty ratio in which the sum of the mask period and the detection processing time is no shorter than the ON period.

Figure 15:
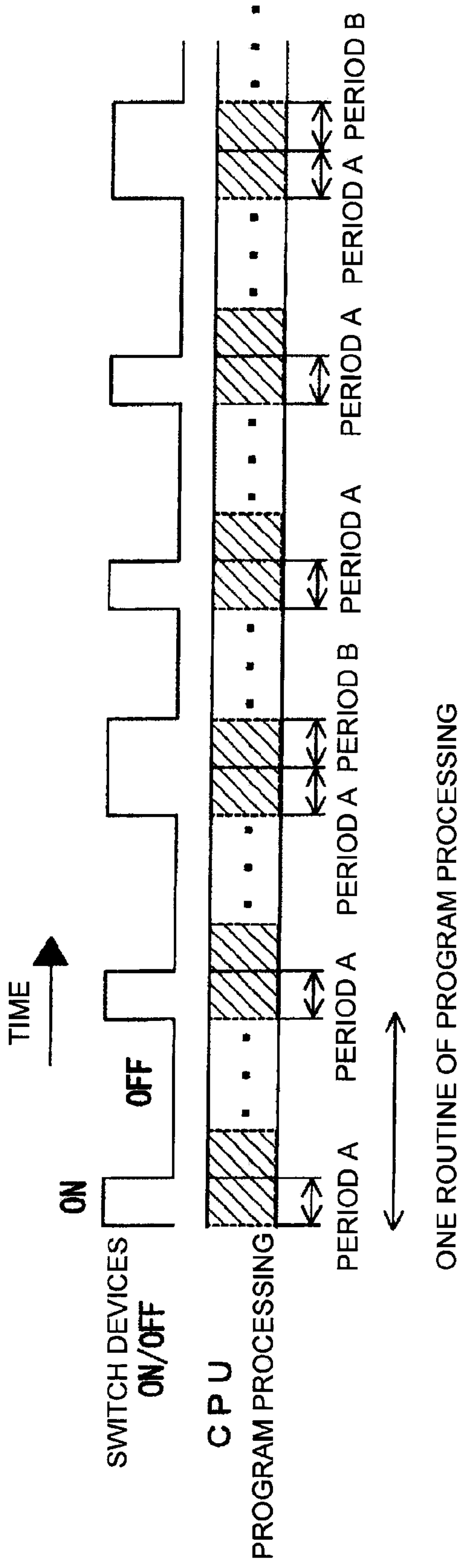
FIG. 15 is a diagram showing another example of the current/voltage detection program executed after the mask period.

Next, another example of the current/voltage detection program executed after the mask period is described with reference to FIG. 15. In the processing of the current/voltage detection program, the voltage value detected in the voltage detection circuits 9-1 to 9-3 is stable and not influenced by the resonant circuits 11-1 to 11-3 immediately after the PMOS transistors 21-1 to 21-3 are turned ON. Therefore, an abnormality can be precisely detected even if the current is detected in a period A that is a mask period in which the current detection is not performed. That is, the period A can be used as a mask period when the current is detected in a period B as well as used as a period for detecting the voltage value. Below, an example is described in which the foregoing period A is used as a period for detecting the voltage value.

The voltage value is detected in the period A starting from immediately after the PMOS transistors 21-1 to 21-3 are turned ON, and the current value is detected in the period B starting after the period A. In addition, the abnormality determination is performed based on the voltage value and the current value detected in the period A and the period B, respectively.

An abnormality determination time using the period A is set shorter than that using the period B. This is because the abnormality based on the voltage value detected in the period A is an output wiring abnormality due to a short circuit or a ground fault as shown in FIG. 9 and has a higher risk of smoke or fire in electronic components due to the large current. In such case, it is necessary to stop the control unit in as short a time as possible. On the other hand, the abnormality based on the current value detected in the period B is an output abnormality of the light source units and has a lower risk because of the lower current. Therefore, it is not necessary to stop the control unit in a short time.

According to the above-described other examples of the current/voltage detection program, it is possible to perform an abnormality determination with adequate detection accuracy (adequate number of detection times) that is suitable for various abnormal states.

The foregoing embodiments are examples of preferred modes for carrying out the present invention, and various modifications can be made within the scope of the claims.

What is claimed is:

1. A dimming control system for a vehicular lamp comprising:

- a plurality of light source units each having a semiconductor light source and a current control portion to control a drive current for driving the semiconductor light source; and
- a control unit connected to the plurality of light source units via power supply lines, wherein the control unit includes:
  - a plurality of switch portions respectively connected in series to the light source units and controlling dimming of the semiconductor light sources by repeating an ON/OFF operation in a predetermined cycle;
  - a plurality of abnormality detection portions that detect a current or a voltage supplied via the power supply lines; and an abnormality determination portion that determines there is an abnormality in the power supply lines or the light source units when a value of the detected current or voltage exceeds a predetermined range while the switch portions are ON, wherein the predetermined cycle includes a first cycle and a second cycle that is longer than the first cycle, and the ON/OFF operation is repeated in both the first cycle and the second cycle;

the plurality of switch portions are controlled such that an ON period of the second cycle is longer than an ON period of the first cycle; and the abnormality determination portion performs an abnormality determination during the ON period of the second cycle.

2. The dimming control system for a vehicular lamp according to claim 1 wherein the abnormality determination portion determines there is an abnormality in the power supply lines or the light source units if a number of times it is detected that the current or the voltage exceeds the predetermined range is equal to or more than a predetermined number of times.

3. The dimming control system for a vehicular lamp according to claim 1 wherein the abnormality determination portion performs the determination after a predetermined period elapses after the switch portions are turned ON, and the abnormality determination portion determines there is an abnormality in the power supply lines or the light source units if a number of times it is detected that the current or the voltage exceeds the predetermined range is equal to or more than a predetermined number of times.

4. A dimming control system for a vehicular lamp comprising:

a plurality of light source units each having a semiconductor light source and a current control portion to control a drive current for driving the semiconductor light source; and a control unit connected to the plurality of light source units via power supply lines, wherein the control unit includes:

a plurality of switch portions respectively connected in series to the light source units and controlling dimming of the semiconductor light sources by repeating an ON/OFF operation in a predetermined cycle;

a plurality of abnormality detection portions that detect a current or a voltage supplied via power supply lines; and an abnormality determination portion that determines there is an abnormality in the power supply lines or the light source units when a value of the detected current or voltage exceed a predetermined range while the switch portions are ON, wherein the abnormality determination portion performs the determination after a predetermined period elapses after the switch portions are turned ON.

5. The dimming control system for a vehicular lamp according to claim 4 wherein the abnormality determination portion determines there is an abnormality in the power supply lines or the light source units if a number of times it is detected that the current or the voltage exceeds the predetermined range is equal to or more than a predetermined number of times.

* * * * *